United States Patent
Kashiwagi et al.

(10) Patent No.: US 9,553,975 B2
(45) Date of Patent: Jan. 24, 2017

(54) PORTABLE TERMINAL AND METHOD FOR CONTROLLING PORTABLE TERMINAL

(71) Applicant: Sharp Kabushiki Kaisha, Osaka-shi, Osaka (JP)

(72) Inventors: Tohru Kashiwagi, Osaka (JP); Michiaki Satou, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/025,709

(22) PCT Filed: Sep. 30, 2014

(86) PCT No.: PCT/JP2014/076123
§ 371 (c)(1),
(2) Date: Mar. 30, 2016

(87) PCT Pub. No.: WO2015/050129
PCT Pub. Date: Apr. 9, 2015

(65) Prior Publication Data
US 2016/0248902 A1 Aug. 25, 2016

(30) Foreign Application Priority Data
Oct. 1, 2013 (JP) ................................. 2013-206852

(51) Int. Cl.
*H04M 1/00* (2006.01)
*H04M 1/725* (2006.01)
*H04M 1/18* (2006.01)
*H04M 1/73* (2006.01)

(52) U.S. Cl.
CPC ........... *H04M 1/72569* (2013.01); *H04M 1/18* (2013.01); *H04M 1/72522* (2013.01); *H04M 1/73* (2013.01); *H04M 2250/12* (2013.01)

(58) Field of Classification Search
CPC H04M 1/72569; H04M 1/18; H04M 1/72522; H04M 1/73; H04M 2250/12; G06F 3/044
USPC ............................... 455/550.1, 575.5, 575.7, 41.1–41.3,455/67.11
See application file for complete search history.

(56) References Cited

U.S. PATENT DOCUMENTS

| 9,134,866 B2* | 9/2015 | Andersson ............. G06F 3/044 |
| 9,294,089 B2* | 3/2016 | Long .................. H03K 17/9622 |
| 2015/0185909 A1* | 7/2015 | Gecnuk .................. G06F 3/044 345/174 |

FOREIGN PATENT DOCUMENTS

| JP | 2011-119959 A | 6/2011 |
| JP | 2012-023554 A | 2/2012 |

* cited by examiner

Primary Examiner — Wayne Cai
(74) Attorney, Agent, or Firm — Keating & Bennett, LLP

(57) ABSTRACT

Avoided is falsely detecting a hand of a usual user being in contact with a contact sensor, instead of detecting an object, such as water, having a high dielectric constant being in contact with the contact sensor. A smartphone (1) includes a contact determination section (101) which determines that (i) a hand is in contact with a contact sensor (11) in a case where an output value outputted by the contact sensor (11) is not lower than TH1 and lower than TH3 and (ii) an object, such as water, having a high dielectric constant is in contact with the contact sensor (11) in a case where the output value is not lower than TH3.

5 Claims, 10 Drawing Sheets

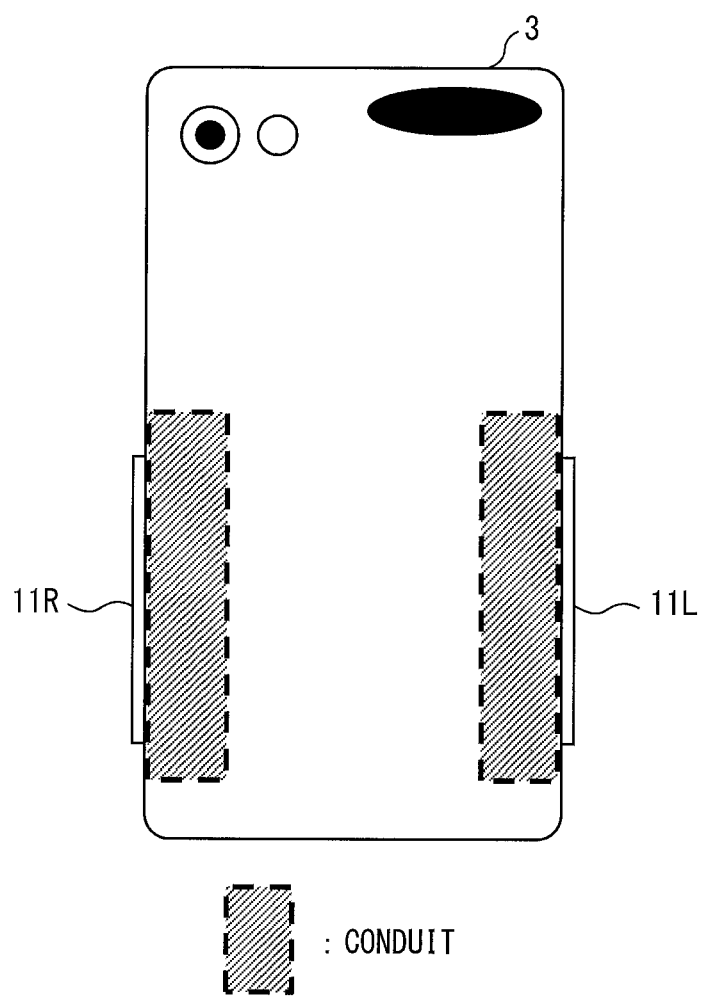

PORTABLE TERMINAL AND METHOD FOR CONTROLLING PORTABLE TERMINAL

TECHNICAL FIELD

The present invention relates a mobile terminal, such as a mobile phone, a PHS, and a cordless phone, including a contact sensor.

BACKGROUND ART

Conventionally, in regard to a mobile terminal including a sensor such as a touch sensor, there has been known a technique of determining, in accordance with contact or the like detected by the sensor, contents of a process to be carried out by the mobile terminal, a situation in which the mobile terminal is in, and the like.

For example, Patent Literature 1 discloses (i) a system which detects fingers or the like being in contact with both of electrodes provided at respective both ends of a terminal employing an electrostatic sensor and (ii) a technique of determining contents of a process depending on the number of the fingers or the like being in contact with the electrodes.

Meanwhile, Patent Literature 2 discloses a mobile terminal which determines, in accordance with information on acceleration and on how the mobile terminal is held, a hand holding the mobile terminal.

CITATION LIST

Patent Literature

[Patent Literature 1]
Japanese Patent Application Publication, Tokukai, No. 2011-119959 A (Publication Date: Jun. 16, 2011)
[Patent Literature 2]
Japanese Patent Application Publication, Tokukai, No. 2012-023554 A (Publication Date: Feb. 2, 2012)

SUMMARY OF INVENTION

Technical Problem

However, the conventional techniques as described above do not deal with malfunction of a sensor which malfunction occurs in a case where a user accidentally submerges a mobile terminal including the sensor. In particular, even in a case where a mobile terminal including a touch sensor is a waterproof terminal by itself, the touch sensor may respond as if a hand of a user is in contact with the touch sensor, when water is in contact with the touch sensor. In a case where the touch sensor responds to water and falsely detects that the hand of the user is in contact with the touch sensor, the mobile terminal including the touch sensor may, for example, falsely activate an application or falsely turn on a display and thereby unnecessarily consumes electric power.

Furthermore, in a case where water remains on a periphery of the touch sensor without being completely removed from the periphery after the mobile terminal is submerged, the touch sensor may falsely detect that the hand of the user is still in contact with the touch sensor. The touch sensor thus may not normally operate until water is completely removed from the periphery of the touch sensor.

The present invention has been made in view of the above problems, and an object of the present invention is to provide (i) a mobile terminal including a contact sensor and (ii) a method of controlling a mobile terminal including a contact sensor, each of which is capable of avoiding falsely determining that a hand of a user is in contact with the contact sensor, in a case where an output value outputted by the contact sensor is extraordinarily high due to water being in contact with the contact sensor.

Solution to Problem

In order to attain the above object, a mobile terminal in accordance with an aspect of the present invention is a mobile terminal including: a contact sensor which, in a case where an object, such as water, having a high dielectric constant is in contact with the contact sensor, outputs an output value whose absolute value is higher than that of an output value which the contact sensor usually outputs in a case where a hand of a user is in contact with the contact sensor, the contact sensor being provided at a position with which the hand of the user is in contact while the user is holding a housing; and a contact determination section which determines that (i) the hand is in contact with the contact sensor in a case where an absolute value of an output value outputted by the contact sensor is not lower than a first threshold and lower than a third threshold which is higher than the first threshold, (ii) the hand is removed from the contact sensor in a case where the absolute value of the output value is not higher than a second threshold which is lower than the first threshold, and (iii) the object, such as water, having the high dielectric constant is in contact with the contact sensor in a case where the absolute value of the output value is not lower than the third threshold.

Advantageous Effects of Invention

According to the mobile terminal thus configured, in a case where an absolute value of an output value outputted by the contact sensor is extraordinarily high due to water being in contact with the contact sensor, it is possible to avoid falsely determining that a hand is in contact with the contact sensor.

BRIEF DESCRIPTION OF DRAWINGS

FIG. 10 is a view illustrating an appearance of a mobile terminal in accordance with further another aspect of the present invention.

DESCRIPTION OF EMBODIMENTS

Embodiment 1

Figure 1:
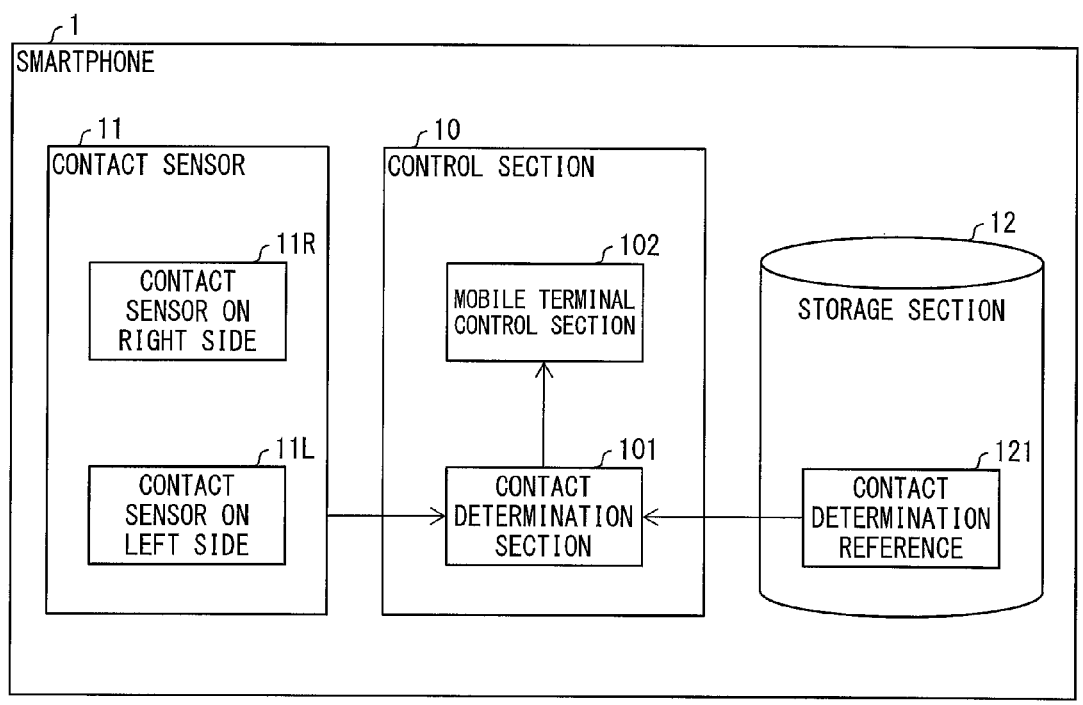
FIG. 1 is a block diagram illustrating an example configuration of a main part of a mobile terminal in accordance with an aspect of the present invention.
Figure 2:
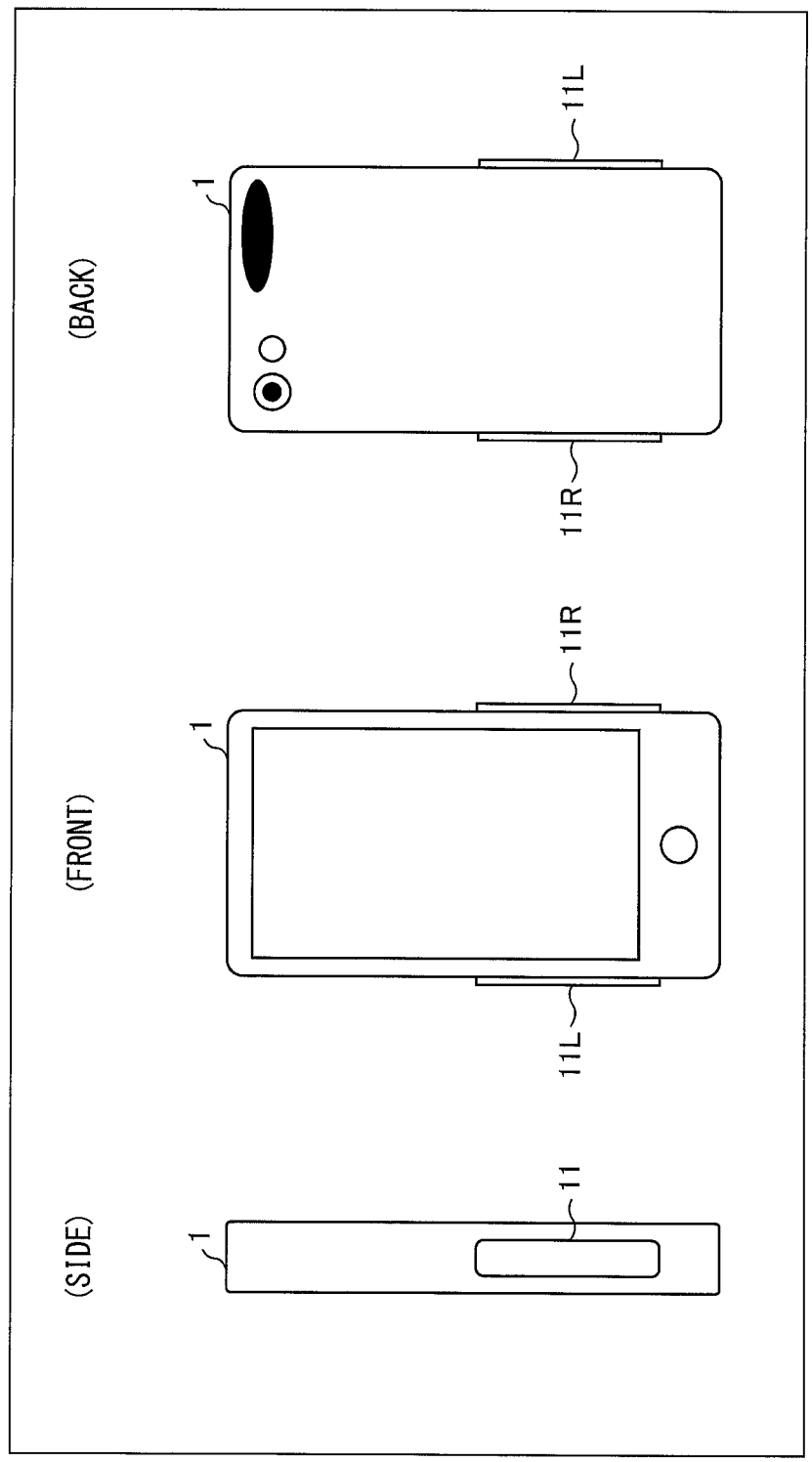
FIG. 2 is a view illustrating an appearance of a smartphone illustrated in FIG. 1.

The following description will discuss Embodiment 1 of the present invention with reference to FIGS. 1 through 6. Note that an example in which a mobile terminal in accordance with Embodiment 1 of the present invention is realized as a smartphone 1 will be described below. FIG. 1 is a block diagram illustrating an example configuration of a main part of the smartphone 1 in accordance with Embodiment 1 of the present invention. FIG. 2 is a view illustrating an appearance of the smartphone 1.

(Outline of Smartphone)

First, an outline of the smartphone 1 will be described below. That is, the smartphone 1 includes: a contact sensor 11 which, in a case where an object, such as water, having a high dielectric constant is in contact with the contact sensor 11, outputs an output value whose absolute value is higher than that of an output value which the contact sensor 11 usually outputs in a case where a hand of a user is in contact with the contact sensor 11, the contact sensor being provided at a position with which the hand of the user is in contact while the user is holding a housing; and a contact determination section 101 which determines that (i) the hand is in contact with the contact sensor 11 in a case where an absolute value of an output value outputted by the contact sensor 11 is not lower than a first threshold TH1 and lower than a third threshold TH3 which is higher than the first threshold TH1, (ii) the hand is removed from the contact sensor 11 in a case where the absolute value of the output value is not higher than a second threshold TH2 which is lower than the first threshold TH1, and (iii) the object, such as water, having a high dielectric constant is in contact with the contact sensor 11 in a case where the absolute value of the output value is not lower than the third threshold TH3. Further, in a case where the absolute value of the output value outputted by the contact sensor 11 is not lower than the third threshold TH3, the contact determination section 101 determines that the contact sensor 11 is in an abnormal state where the object, such as water, having a high dielectric constant is in contact with the contact sensor 11. In a case where the absolute value of the output value outputted by the contact sensor 11 is lower than TH3 Hysteresis, the contact determination section 101 determines that determination that the contact sensor 11 is in the abnormal state can be cancelled. Therefore, according to the smartphone 1, in a case where the absolute value of the output value outputted by the contact sensor 11 is extraordinarily high due to water being in contact with the contact sensor 11, it is possible to avoid falsely determining that a hand is in contact with the contact sensor 11. Accordingly, in a case where, for example, the user accidentally submerges the smartphone 1, the smartphone 1 does not carry out operation which the smartphone 1 carries out in a case where smartphone 1 falsely determines that a hand is in contact with the contact sensor. That is, the smartphone 1 is capable of reducing unnecessary operation and thereby reducing electric power consumption, and moreover, capable of carrying out stable and safe operation. Furthermore, according to the smartphone 1, after determining that the object, such as water, having a high dielectric constant is in contact with the contact sensor 11, the contact determination section 101 determines that the object, such as water, having a high dielectric constant is in contact with the contact sensor 11, until the absolute value of the output value outputted by the contact sensor 11 becomes not higher than a fourth threshold TH3 Hysteresis which is lower than the third threshold TH3. Therefore, according to the smartphone 1, by setting the fourth threshold TH3 Hysteresis so as to be lower than the third threshold, it is possible to avoid false operation such that, since the absolute value of the output value outputted by the contact sensor 11 becomes higher and lower than the third threshold TH3 so that unstable operation (such as chattering) occurs, the contact determination section 101 repeats (i) determination that the contact sensor 11 is in the abnormal state and (ii) determination that the smartphone 1 is held by a hand, although the contact sensor 11 is in the abnormal state. In particular, once the mobile terminal is submerged, water is generally not removed completely from around the contact sensor, even after the mobile terminal is taken out of the water. This may cause a state where the absolute value of the output value outputted by the contact sensor does not become lower than the fourth threshold TH3 Hysteresis. In contrast, according to the smartphone 1, the contact determination section 101 determines that water is in contact with the contact sensor 11, until the absolute value of the output value outputted by the contact sensor 11 becomes not higher than the fourth threshold TH3 Hysteresis. Therefore, according to the smartphone 1, in a state where water is not completely removed from around the contact sensor 11, it is possible to stably avoid falsely detecting a hand being in contact with the contact sensor 11. Note that, in the following description, the first threshold TH1 through the fourth threshold TH3 Hysteresis (hereinafter, referred to as a fourth threshold TH4) will be referred to as TH1 through TH4 for short so as to avoid redundancy.

As illustrated in FIG. 1, the smartphone 1 includes a control section 10, a contact sensor 11, and a storage section 12. Note that, although the smartphone 1 further includes mechanisms, such as a microphone, a speaker, a touch panel screen, a communication section, and an electric power source, necessary to function as a smartphone, the mechanisms are not illustrated in FIG. 1 because they are not directly related to the features of the present invention.

The contact sensor 11 is provided at a position on the smartphone 1 with which position a hand of a user is in contact while the user is holding the smartphone 1. For example, the contact sensor 11 is provided to a lower half of a side of the smartphone 1. The contact sensor 11 detects, for example, an object being in contact with or removed from the contact sensor 11, and outputs a result of such detection as an output value. Note, here, that an absolute value of the output value, outputted by the contact sensor 11 in a case where the contact sensor 11 detects the hand of the user being in contact with or removed from the contact sensor 11, normally falls within a predetermined range. Further, the absolute value of the output value, outputted in a case where the contact sensor 11 detects the hand of the user being removed from the contact sensor 11, is lower than that of the output value outputted in a case where the contact sensor 11 detects the hand of the user being in contact with the contact sensor 11. Meanwhile, the absolute value of the output value, outputted by the contact sensor 11 in a case where the contact sensor 11 detects water being in contact with the contact sensor 11, is extraordinarily higher than that of the output value outputted by the contact sensor 11 in a case where the contact sensor 11 detects the hand being in contact with the contact sensor 11. Note that, once water comes into contact with the contact sensor 11, the output value tends to be unstable until the water is completely removed from around the contact sensor 11. That is, the contact sensor 11 can be in the following two states in addition to a normal state where the output value falls within the predetermined range, within which the output value, outputted in a case where the contact sensor 11 detects the hand of the user being in contact with or removed from the contact sensor 11, can fall within. Namely, the contact sensor 11 can be in an abnormal state where the contact sensor 11 outputs an extraordinarily high output value. Further, the contact sensor 11 can be in an unstable state where the output value is not stable, after being in the abnormal state. Note also that the contact sensor 11, not always, but periodically detects an object being in contact with or removed from the contact sensor 11 so that electric power consumption is suppressed. A cycle of the detection can be controlled by a detection cycle control section (not illustrated). Note that, in a case where it is necessary to especially distinguish between (i) the contact sensor 11 which is provided on a right side of the smartphone 1 when a display screen of the smartphone 1 is viewed from a front of the smartphone 1 and (ii) the contact sensor 11 which is provided on a left side of the smartphone 1 when the display screen of the smartphone 1 is viewed from the front of the smartphone 1, the contact sensor 11 which is provided on the right side will be referred to as a contact sensor 11R, and the contact sensor 11 which is provided on the left side will be referred to as a contact sensor 11L.

The storage section 12 stores therein various sets of data used by the smartphone 1. The storage section 12 stores therein (1) a control program, (2) an OS program, (3) an application program which is used to realize various functions, and (4) various sets of data which are read in a case where the application program is executed. Each of those sets of data (1) through (4) is executed by the control section 10 of the smartphone 1. Further, the storage section 12 stores therein contact determination references 121 (later described in detail). The sets of data (1) through (4) are stored in a nonvolatile storage device such as a ROM (Read Only Memory), a flash memory, an EPROM (Erasable Programmable ROM), an EEPROM (registered trademark) (Electrically EPROM), and an HDD (Hard Disc Drive). The smartphone 1 can include a temporary storage section (not illustrated). The temporary storage section is a so-called working memory which, in the course of various processes carried out by the smartphone 1, temporarily stores therein, for example, (i) data used for calculation and (ii) a result of the calculation. The temporary storage section is made of a volatile memory such as a RAM (Random Access Memory). What data is stored in which storage device is determined as appropriate in accordance with an intended purpose, convenience, a cost, a physical restriction, or the like of the smartphone 1.

The control section 10 integrally controls functions, including a normal determination process, an abnormal determination process, and an unstable determination process, of the smartphone 1. The normal determination process, the abnormal determination process, the unstable determination process will be later described in detail. The control section 10 illustrated in FIG. 1 includes, as function blocks, a contact determination section 101 and a mobile terminal control section 102. Each of the function blocks of the control section 10 can be realized by, for example, a CPU (Central Processing Unit) (i) reading, to a RAM (Random Access Memory) or the like (not illustrated), a program stored in a storage device (storage section 12) realized by a ROM (Read Only Memory), a NVRAM (Non-Volatile Random Access Memory), or the like and (ii) executing the program. The control section 10 will be described below in detail.

The contact determination section 101 determines whether the hand of the user is in contact with or removed from the contact sensor 11 or whether water is in contact with the contact sensor 11. The contact determination section 101 carries out such determination processes in accordance with (i) the output value outputted by the contact sensor 11 and (ii) the contact determination references 121 stored in the storage section 12. The determination processes carried out by the contact determination section 101 includes the normal determination process, the abnormal determination process, and the unstable determination process. The normal determination process is a process of determining that the hand of the user is in contact with or removed from the contact sensor 11. In a case where the contact determination section 101 determines that the contact sensor 11 is in the normal state, the contact determination section 101 carries out the normal determination process in accordance with the output value outputted by the contact sensor 11. The abnormal determination process is a process of (i) determining that the contact sensor 11 is in the abnormal state and (ii) determining that not the hand of the user but water is in contact with the contact sensor 11. The unstable determination process is a process of determining that the contact sensor 11 is in the unstable state after being in the abnormal state and that the hand of the user is not in contact with the contact sensor 11. In a case where the output value remains lower than TH3 but not lower than TH4, the contact determination section 101 carries out the unstable determination process. Each of those processes will be later described in detail. The mobile terminal control section 102 obtains, from the contact determination section 101, a result of determination that the hand of the user is in contact with or removed from the contact sensor 11. In accordance with the result of the determination and the like, the mobile terminal control section 102 controls, for example, screen display to be turned on or off.

(Information Stored in Storage Section)

The contact determination references 121 indicate the thresholds TH1 through TH4, and are references with which the contact determination section 101 compares the output value outputted by the contact sensor 11 so as to determine that the hand of the user is in contact with or removed from the contact sensor or water is in contact with the contact sensor 11. Specifically, TH1 is a threshold in accordance with which the contact determination section 101 determines that the hand of the user is in contact with the contact sensor 11. TH2 is a threshold which is lower than TH1 and in accordance with which the contact determination section 101 determines that the hand of the user is removed from the contact sensor 11. TH3 is a threshold which is higher than TH1 and in accordance with which the contact determination section 101 determines that water is in contact with the contact sensor 11. Note that, although it is assumed in Embodiment 1 that water causes the output value to be not lower than TH3, an object, other than water, which results in the abnormal state can cause the output value to be not lower than TH3. TH4 is a value which is set after water comes into contact with the contact sensor 11 and which is set so as to cancel such an abnormal state. TH4 is a threshold which is lower than TH3 and which is used to cancel the abnormal state after the contact determination section 101 determines that the contact sensor 11 is in the abnormal state. For example, TH4 and TH 2 can have an identical value. Note that TH1 through TH4 can be set for each of the contact sensors 11R and 11L. In a case where the output value outputted by the contact sensor 11 is not lower than TH3, the contact determination section 101 determines that the contact sensor 11 is in the abnormal state, and carries out the abnormal determination process. In a case where the output value outputted by the contact sensor 11 never becomes not lower than TH3 and remains lower than TH3, the contact determination section 101 carries out the normal determination process. In the normal determination process, in a case where the output value outputted by the contact sensor 11 is lower than TH3 and not lower than TH1, the contact determination section 101 determines that the hand of the user is in contact with the contact sensor 11. In a case where the output value is lower than TH1 and higher than TH2, the contact determination section 101 determines that the hand of the user remains in contact with the contact sensor 11. In a case where the output value is not higher than TH2, the contact determination section 101 determines that the hand of the user is removed from the contact sensor 11. Meanwhile, in a case where the output value outputted by the contact sensor 11 once becomes not lower than TH3 and then becomes lower than TH3 but not lower than TH4, the contact determination section 101 determines that the contact sensor 11 in the unstable state, and carries out the unstable determination process. Note that each value of TH1 through TH4 can be automatically changed in accordance with its reference level (state where no response is made). Next, the normal determination process, the abnormal determination process, and the unstable determination process will be described below.

(Normal Determination Process)

Figure 3:
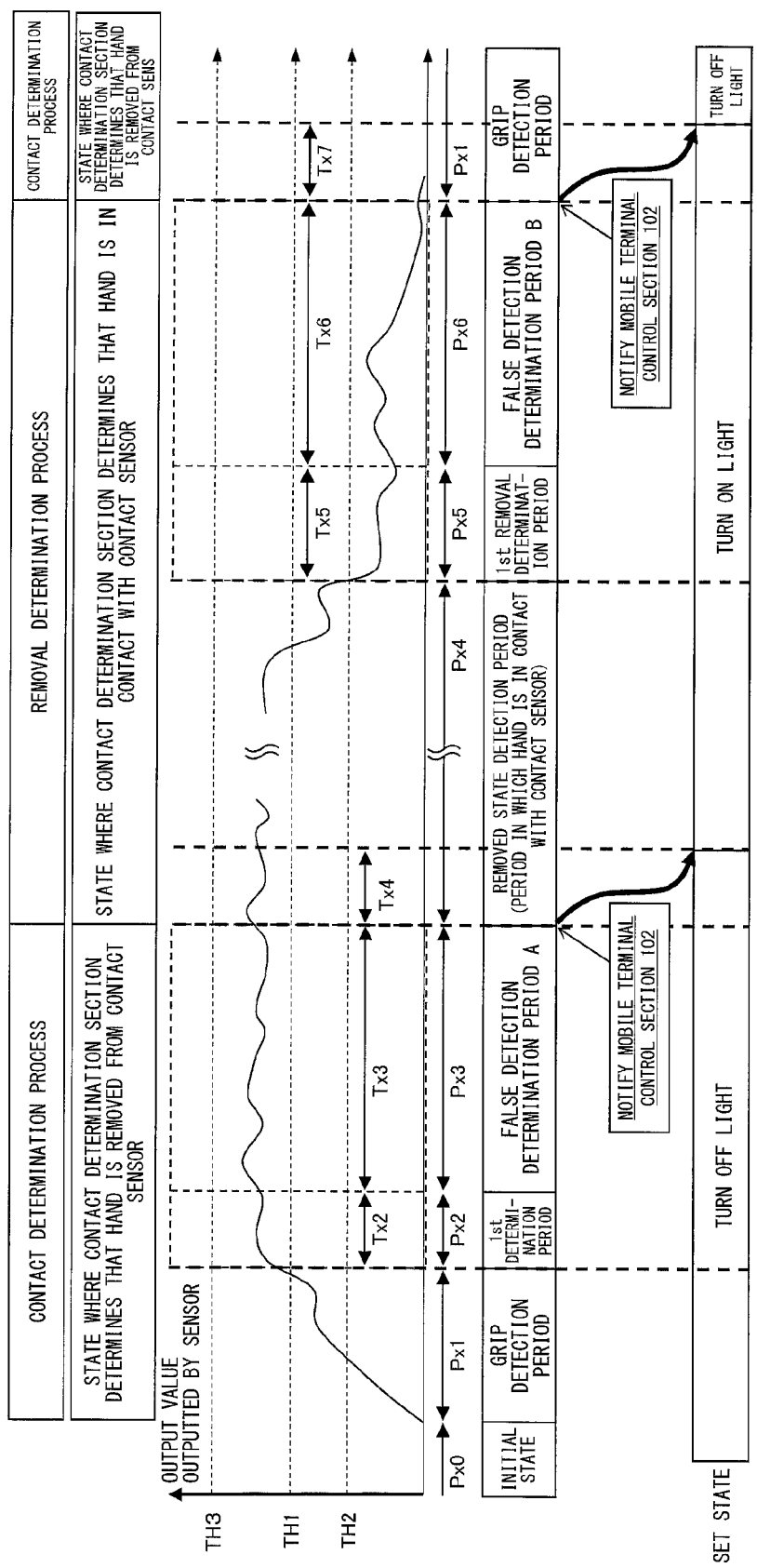
FIG. 3 is a view illustrating an outline of a normal determination process carried out by the smartphone illustrated in FIG. 1.

FIG. 3 is a view illustrating an outline of the normal determination process carried out by the smartphone 1.

Note that, in the following description, the determination is carried out in accordance with a set of output values outputted by the respective contact sensors 11R and 11L. Note, however, that the determination can be carried out individually in accordance with the output values outputted by the respective contact sensors 11R and 11L. That is, the determination can be carried out in accordance with each of the output values outputted by the respective contact sensors 11R and 11L. Alternatively, control can be carried out in accordance with a combination of the output values outputted by the respective contact sensors 11R and 11L.

First, the outline of the normal determination process will be described below. In a case where the contact determination section 101 once determines that the output value outputted by the contact sensor 11 is not lower than TH1 or not higher than TH2 (1st determination period), the contact determination section 101 proceeds to a false detection determination period. In the false detection determination period, the contact determination section 101 fixes (i) determination of whether the hand of the user is actually in contact with or removed from the contact sensor 11 and (ii) determination of whether the hand of the user is in contact with or removed from both of the contact sensors 11R and 11L. Merely in a case where the contact determination section 101 can fix the determination that the hand is in contact with or removed from the contact sensor 11, the contact determination section 101 notifies the mobile terminal control section 102 of a result of the determination and the like.

According to the smartphone 1, a thinned-out scan is carried out, that is, the cycle of the detection carried out by the contact sensor 11 is controlled so as to be longer. This realizes a reduction in electric power. Note, however, that, it is difficult to accurately determine whether the hand of the user is actually in contact with or removed from the contact sensor 11, merely in accordance with the output value outputted by the contact sensor 11 as a result of a single time of detection. Therefore, according to the smartphone 1, by carrying out the determination in accordance with a plurality of output values outputted by the contact sensor 11, that is, by carrying out a plurality of times of detection, accuracy of determination of whether the hand is in contact with or removed from the contact sensor 11 is increased. Furthermore, according to the smartphone 1, the cycle of the detection carried out by the contact sensor 11 is set for each of a case where the contact sensor 11 detects the hand being in contact with the contact sensor 11 (contact determination process) and a case where the contact sensor 11 detects the hand being removed from the contact sensor 11 (removal determination process). Moreover, according to the smartphone 1, the cycle of the detection (scan time) is set for each of the 1st determination period and the false detection determination period, which comes subsequent to the 1st determination period. That is, the 1st determination period and the false detection determination period are set for each of the case where the contact sensor 11 detects the hand being in contact with the contact sensor 11 and the case where contact sensor 11 detects the hand being removed from the contact sensor 11. Therefore, since it is thus possible to set the cycle of the detection for each of those four periods, it is possible to change (i) time taken until the contact sensor 11 detects the hand being in contact with the contact sensor 11 (holding the smartphone 1) and (ii) time taken until the contact sensor 11 detects the hand being removed from the contact sensor 11 (releasing the smartphone 1). Therefore, it is possible to improve usability by setting the four periods as appropriate in accordance with intended use of the smartphone 1. After the contact determination section 101 once confirms a state where the user holds the smartphone 1 (state where the output value outputted by the contact sensor 11 is not lower than TH1) or a state where the user releases the smartphone 1 (state where the output value outputted by the contact sensor 11 is not higher than TH2), the contact determination section 101 immediately carries out a process which is carried out in the false detection determination period (process of fixing the determination that the hand is in contact with or removed from the contact sensor 11). As such, after there is once a response (after the output value outputted by the contact sensor 11 is not lower than TH1 or not higher than TH2), it is possible to immediately notify the mobile terminal control section 102 by carrying out a high-speed scan (detection whose cycle is shorter than usual). Accordingly, it is possible to improve operability of the smartphone 1. Note that that, in a case where the high-speed scan is always carried out, an interval between the detection, that is, the cycle of the detection is caused to be shorter so that a plurality of times of detection are carried out in a short time. This causes an increase in electric power consumption. However, since the thinned-out scan is carried out, it is possible to suppress electric power consumption by reducing the detection to a minimum while the response is awaited, that is, while the output value outputted by the contact sensor 11 is not higher than TH1. Note, here, that the output values outputted by the respective contact sensors 11R and 11L are determined in accordance with the following two methods. According to a first method, after at least one of the output values outputted by the respective contact sensors 11R and 11L becomes higher than TH1 or lower than TH2, both of the contact sensors 11R and 11L are caused to carry out the high-speed scan. In this case, for example, since both of the contact sensors 11R and 11L are caused to carry out the high-speed scan in a case where the hand is in contact with one of the contact sensors 11R and 11L, it is possible to immediately notify the mobile terminal control section 102 in a case where the hand comes into contact with the other one of the contact sensors 11R and 11L. According to a second method, in a case where merely one of the output values outputted by the respective contact sensors 11R and 11L becomes higher than TH1 or lower than TH2, none of the contact sensors 11R and 11L are caused to carry out the high-speed scan. According to the second method, in a case where both of the output values outputted by the respective contact sensors 11R and 11L become higher than TH1 or lower than TH2, both of the contact sensors 11R and 11L are, for the first time, caused to carry out the high-speed scan, and the mobile terminal control section 102 is notified through the false detection determination period. In the second method, response time (time taken until the smartphone 1 makes a response after the hand comes into contact with or is removed from the contact sensor 11) is longer as compared with the first method. However, the second method is tolerant to false detection of, for example, noise. Furthermore, the second method makes it possible to suppress electric power consumption because, in the second method, the high-speed scan is suppressed as compared with the first method.

Next, a process which the contact determination section 101 carries out in accordance with the output value outputted by the contact sensor 11 will be described with reference to FIG. 3. Px1 indicates a grip detection period. During Px1, the output value outputted by the contact sensor 11 is not higher than TH1, and the contact determination section 101 monitors the output value, outputted by the contact sensor 11, so as to determine whether the hand of the user is in contact with the contact sensor 11. Px2 indicates the 1st determination period. In Px2, the contact determination section 101 determines whether the output value outputted by the contact sensor 11 is higher than TH1 over a predetermined time or more. In a case where the output value outputted by the contact sensor 11 is higher than TH1 over the predetermined time or more, the contact determination section 101 proceeds to a false detection determination period A (false operation detection period A) in which the contact determination section 101 determines, with a high degree of accuracy, whether the hand of the user is in contact with the contact sensor 11, that is, the contact determination section 101 fixes the determination that the hand in contact with the contact sensor 11. In a case where, in the 1st determination period, a state where the output value outputted by the contact sensor 11 is higher than TH1 does not last for the predetermined time, the contact determination section 101 does not proceed to the false detection determination period A. Tx2 which indicates a time period of Px2 is longer than Tjx2 which indicates a time period in which 1st determination is fixed. Px3 indicates the false detection determination period A (for contact determination). In the false detection determination period A, in a case where the state where the output value outputted by the contact sensor 11 is higher than TH1 lasts over a predetermined time or more continuously after the 1st determination period, the contact determination section 101 determines, for the first time, that the hand of the user is in contact with the contact sensor 11, and notifies the mobile terminal control section 102 of a result of such determination. Tx3 which indicates a time period of Px3 is longer than Tjx3 which indicates a time period in which false detection is avoided. Px4 indicates a pre-removal state (state before the hand is removed from the contact sensor 11) detection period, and lasts until the contact determination section 101 determines that the hand of the user is removed from the contact sensor 11. More specifically, Px4 is a period which comes subsequent to Px3 and in which the output value outputted by the contact sensor 11 is not lower than TH2. In this period, the contact determination section 101 determines in accordance with the output value outputted by the contact sensor 11 that the hand of the user remains in contact with the contact sensor 11. Px5 indicates a 1st removal determination period. In this period, the contact determination section 101 determines whether the output value outputted by the contact sensor 11 is lower than TH2 over a predetermined time or more. In a case where the contact determination section 101 determines that the output value is lower than TH2 over the predetermined time or more, the contact determination section 101 proceeds to a false detection determination period B (false operation determination period B) in which the contact determination section 101 determines, with a high degree of accuracy, whether the hand of the user is removed from the contact sensor 11. In a case where, in the 1st removal determination period, a state where the output value outputted by the contact sensor 11 is lower than TH2 does not last for the predetermined time, the contact determination section 101 does not proceed to the false detection determination period B. Tx5 which indicates a time period of Px5 is longer than Tjx5 which indicates a time period in which 1st removal determination is fixed. Px6 indicates the false detection determination period B (for removal determination). In the false detection determination period B, in a case where the state where the output value outputted by the contact sensor 11 is lower than TH2 lasts continuously after the 1st removal determination period, the contact determination section 101 determines, for the first time, that the hand of the user is removed from the contact sensor 11, and notifies the mobile terminal control section 102 of a result of such determination. Tx6 which indicates a time period of Px6 is longer than Tjx6 which indicates a time period in which false determination is avoided.

By the contact determination section 101 carrying out a normal process described above, the smartphone 1 is capable of having an increased speed of responding to an operation carried out by the user. That is, it is possible to reduce a time from when the contact determination section 101 determines that the hand is in contact with or removed from the contact sensor 11 to when the contact determination section 101 notifies the mobile terminal control section 102 of a result of such determination. Moreover, according to the smartphone 1, for example, the cycle of the detection is controlled so as to be longer in the grip detection period and the pre-removal state detection period than in the 1st determination period, the false detection determination period A, the 1st removal determination period, and the false detection determination period B. This makes it possible to suppress electric power consumption. Next, the abnormal determination process and the unstable determination process will be described.

(Abnormal Determination Process and Unstable Determination Process)

Figure 4:
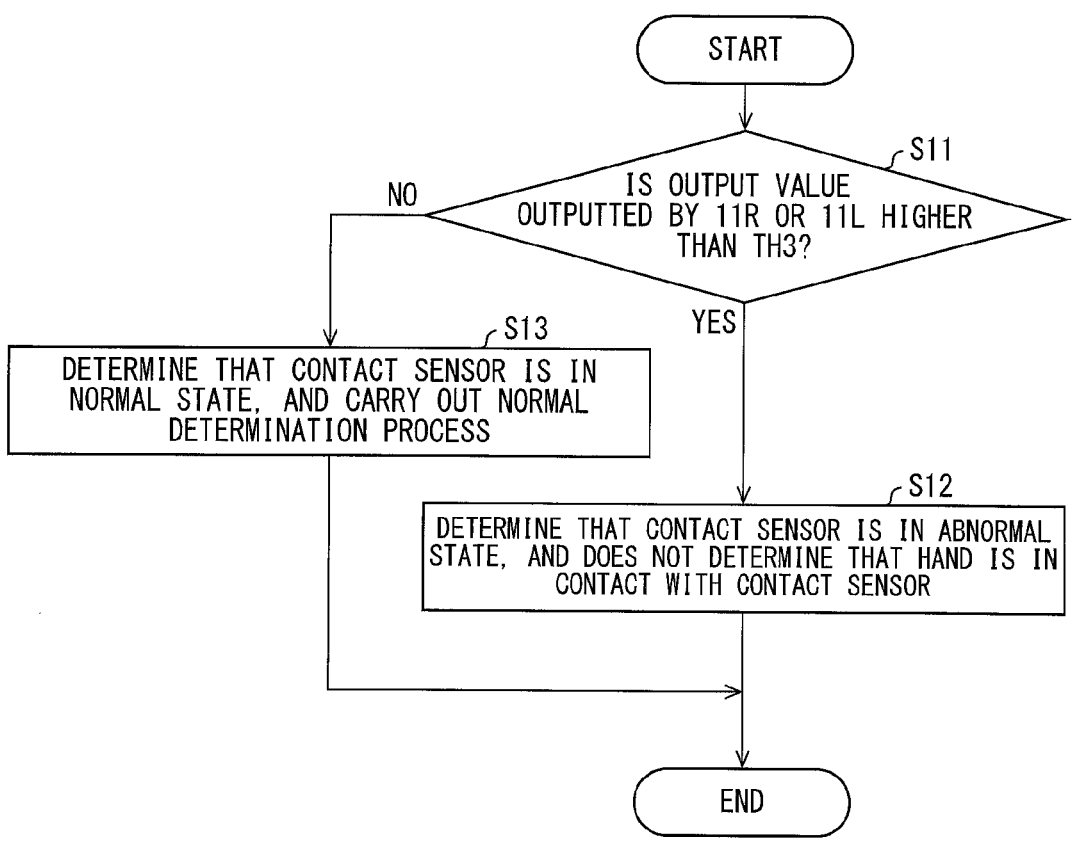
FIG. 4 is a flowchart illustrating a flow of an abnormal determination process carried out by the smartphone illustrated in FIG. 1.

FIG. 4 is a flowchart illustrating a flow of the abnormal determination process carried out by the smartphone 1. The contact determination section 101 examines whether an output value outputted by the contact sensor 11R or 11L is higher than TH3 (step S11). In a case where such an output value outputted by the contact sensor 11 is higher than TH3 (YES, in the step S11), the contact determination section 101 determines that the contact sensor 11 is in the abnormal state, and does not determine that a hand is in contact with the contact sensor 11 (step S12). The contact determination section 101 then notifies, for example, the mobile terminal control section 102 of a result of such determination. In a case where the output value is not higher than TH3 (NO, in the step S11), the contact determination section 101 determines that the contact sensor 11 is in the normal state, and carries out the normal determination process (step S13). That is, according to a method of controlling the smartphone 1, in a case where an absolute value of an output value outputted by the contact sensor 11 is not lower than TH1 (first threshold) and lower than TH3 (third threshold), it is determined that a hand is in contact with the contact sensor 11. In a case where the absolute value of the output value is not higher than TH2 (second threshold), it is determined that the hand is removed from the contact sensor 11. In a case where the absolute value of the output value is not lower than TH3, it is determined that the contact sensor 11 is in the abnormal state where an object, such as water, having a high dielectric constant is in contact with the contact sensor 11.

Figure 5:
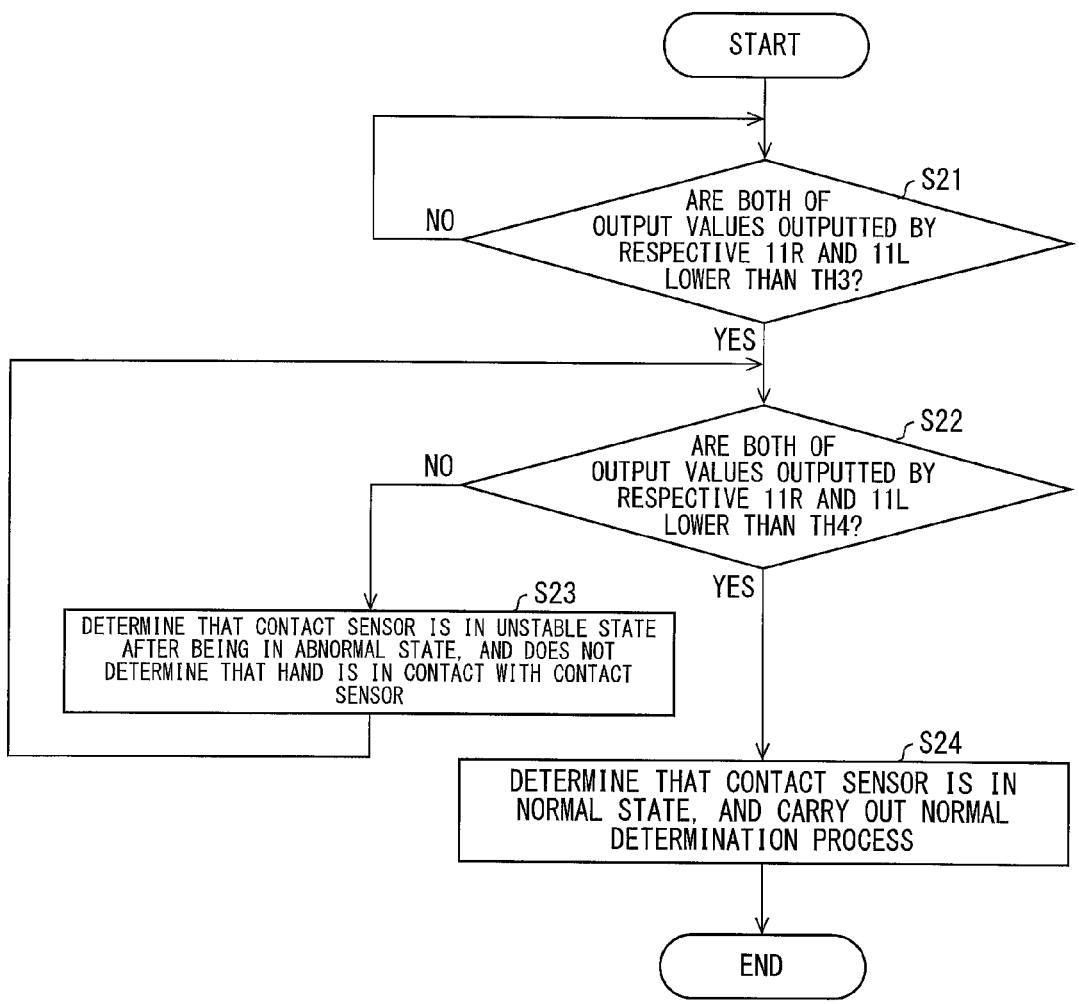
FIG. 5 is a flowchart illustrating a flow of an unstable determination process carried out by the smartphone illustrated in FIG. 1.

FIG. 5 is a flowchart illustrating a flow of the unstable determination process carried out by the smartphone 1. The contact determination section 101 examines whether both of output values outputted by the respective contact sensors 11R and 11L are lower than TH3 (step S21). In a case where such an output value outputted by the contact sensor 11 is not lower than TH3, the contact determination section 101 repeats the step S21 until the output value outputted by the contact sensor 11 is lower than TH3. In a case where the output value outputted by the contact sensor 11 is lower than TH3 (YES, in the step S21), the contact determination section 101 further examines whether both of the output values outputted by the respective contact sensors 11R and 11L are lower than TH4 (step S22). In a case where the output value outputted by the contact sensor 11 is not lower than TH4 (NO, in the step S22), the contact determination section 101 determines that the contact sensor 11 is in the unstable state after being in the abnormal state, and does not determine that a hand is in contact with the contact sensor 11 (step S23). That is, the contact determination section 101 determines that the hand is not in contact with the contact sensor 11. The contact determination section 101 then repeats the steps S22 and S23 until the output value is lower than TH4. While the contact determination section 101 is determining that the contact sensor 11 is in the unstable state, the contact determination section 101 notifies, for example, the mobile terminal control section 102 of a result of determination that the hand is not in contact with the contact sensor 11. In a case where the output value is lower than TH4 (YES, in the step S22), the contact determination section 101 determines that the contact sensor 11 is brought back to the normal state, and carries out the normal determination process (step S24).

Figure 6:
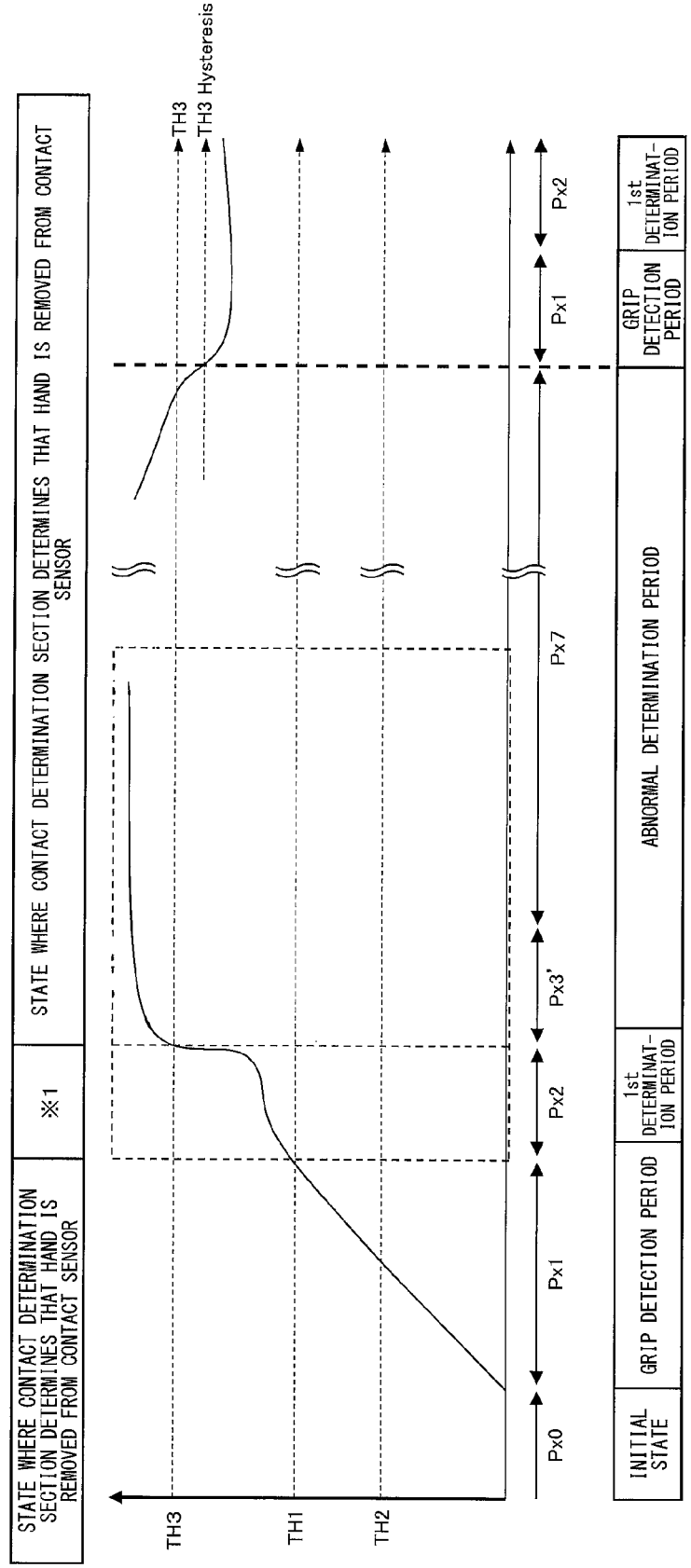
FIG. 6 is a view illustrating an outline of the abnormal determination process and an outline of the unstable determination process each of which processes is carried out by the smartphone illustrated in FIG. 1

FIG. 6 is a view illustrating an outline of the abnormal determination process and an outline of the unstable determination process each of which processes is carried out by the smartphone 1. As has been described, TH3 is a threshold in accordance with which the contact determination section 101 determines that the contact sensor 11 is in the abnormal state, and TH4 (TH3 Hysteresis) is a threshold in accordance with which such determination that the contact sensor 11 is in the abnormal state is cancelled. That is, in a case where at least one of the output values outputted by the respective contact sensors 11R and 11L becomes not lower than TH3, the contact determination section 101 determines that, not the hand, but an object, such as water, other than the hand is in contact with the contact sensor 11, and deals such a state as the abnormal state. Note that, in so doing, the contact determination section 101 can optionally supply, to the control section, a notification of such an abnormality (interruption). Once the output value outputted by the contact sensor 11 becomes not lower than TH3, the contact determination section 101 deals with such a state as the abnormal state until both of the output values outputted by the respective contact sensors 11R and 11L becomes not higher than TH4. Note that, in a case where, not at least one, but both of the output values outputted by the respective contact sensors 11R and 11L become not lower than TH3, the contact determination section 101 can determine that such a state is the abnormal state. Note also that, as has been described above, each of TH3 and TH4 can be set for each of the contact sensors 11R and 11L. In FIG. 6, Px7 indicates a period in which a start of the unstable determination process is awaited. Once the output value outputted by the contact sensor 11 becomes not lower than TH3, the contact sensor 11 carries out the scan, that is, the detection, but, the contact determination section 101 does not carry out the normal determination process and the unstable determination process in accordance with the output value outputted by the contact sensor 11 as a result of the detection. The normal determination process and the unstable determination process are not carried out until the output value outputted by the contact sensor 11 becomes lower than TH4. Px3' includes the 1st determination period and an abnormal determination period. In the 1st determination period, in a case where each of the output values outputted by the respective contact sensors 11R and 11L is higher than TH1 and not higher than TH3 over predetermined times of the scan (predetermined time) or more, the contact determination section 101 proceeds to the false detection determination period A (false operation determination period A) as the normal determination process. On the other hand, in the 1st determination period, in a case where each of the output values outputted by the respective contact sensors 11R and 11L is higher than TH3 over the predetermined times of the scan (predetermined time) or more, the contact determination section 101 proceeds to the abnormal determination period. In the abnormal determination period, in a case where each of the output values outputted by the respective contact sensors 11R and 11L is higher than TH3 over predetermined times of the scan or more, the contact determination section 101 carries out the abnormal determination process. In the abnormal determination period, the contact determination section 101 does not carry out the normal determination process until the output value outputted by the contact sensor 11 becomes lower than TH4. However, the contact determination section 101 carries out the unstable determination process at a time when the output value outputted by the contact sensor 11 becomes lower than TH3. In a case where the output value which has been once higher than TH3 becomes lower than TH4, the contact determination section 101 proceeds to the normal determination process, that is, proceeds to the grip detection period which is a period coming prior to the 1st determination period in which the contact determination section 101 first determines whether or not the hand of the user is in contact with the contact sensor 11. Note that, in a period represented by "*1"

illustrated in FIG. 6, the contact determination section 101 may once determine that the hand of the user is in contact with the contact sensor 11.

Embodiment 2

Figure 7:
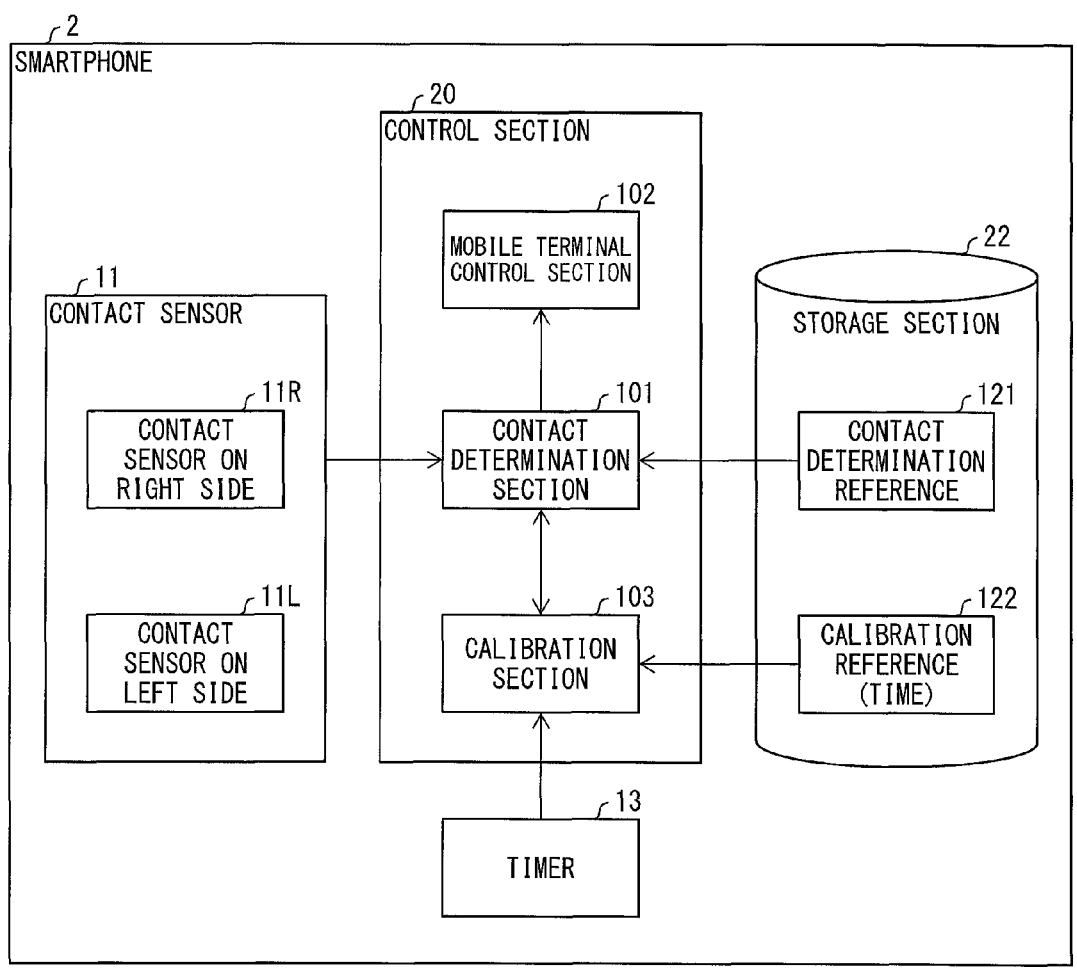
FIG. 7 is a block diagram illustrating an example configuration of a main part of a mobile terminal in accordance with another aspect of the present invention.
Figure 8:
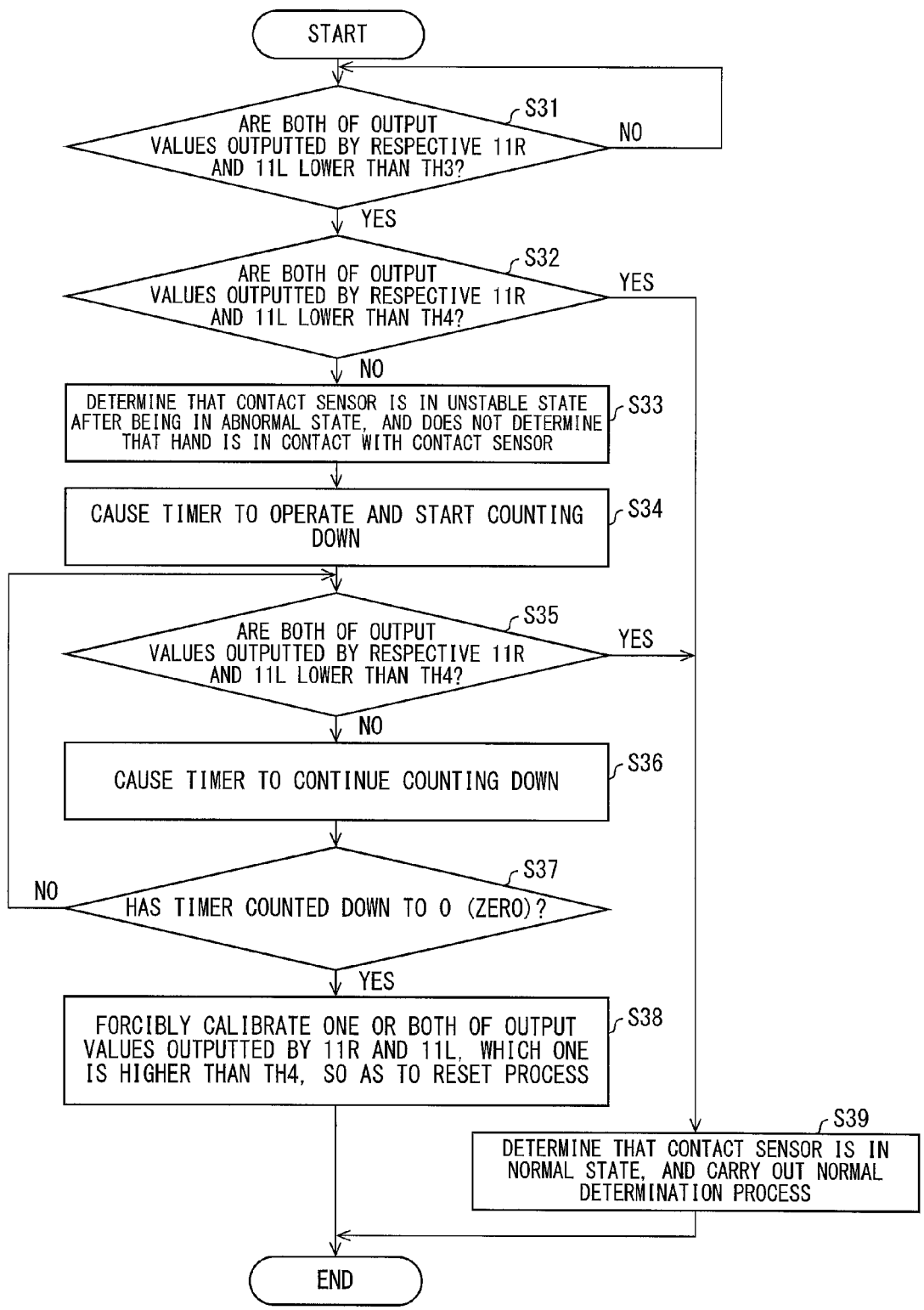
FIG. 8 is a flowchart illustrating a flow of a process carried out by the smartphone illustrated in FIG. 7.

The following description will discuss Embodiment 2 of the present invention with reference to FIGS. 7 and 8. Note that, for convenience, identical reference numerals will be given to respective members having functions identical to those of the members described in Embodiment 1, and description of the members will be omitted. FIG. 7 is a block diagram illustrating an example configuration of a main part of a smartphone 2 in accordance with Embodiment 2. As illustrated in FIG. 7, the smartphone 2 further includes (i) a timer 13 and (ii) a calibration section 103 (calibration means) in a control section 20, as compared with the smartphone 1. Furthermore, in addition to contact determination references 121, calibration reference time 122 is further stored in a storage section 22 of the smartphone 2. The calibration reference time 122 is a time in accordance with which a timing when the calibration section 103 calibrates an absolute value of an output value outputted by a contact sensor 11 is determined. Note that calibration means adjusting a value which serves as a reference of the output value outputted by the contact sensor 11. The timer 13 measures duration of a state where the absolute value of the output value outputted by the contact sensor 11 is lower than TH3 and higher than TH4. In a case where the duration measured by the timer 13 exceeds the calibration reference time 122 (predetermined time), the calibration section 103 calibrates the absolute value of the output value outputted by the contact sensor 11. Therefore, according to the smartphone 2, in a case where the absolute value of the output value outputted by the contact sensor 11 is lower than TH3 but higher than TH4 so that, although a hand is actually in contact with the contact sensor 11, it remains impossible to accurately determine that the hand is in contact with the contact sensor 11, the calibration section 103 calibrates the absolute value of the output value outputted by the contact sensor 11. Therefore, it is possible to avoid false detection in a case where the absolute value of the output value outputted by the contact sensor 11 is extraordinarily high due to water being in contact with the contact sensor 11, and further possible to improve convenience in the following points. Note that the false detection means that, in a scene or a usage case beyond user's expectation, a hand being in contact with or removed from the contact sensor 11 is detected, and accordingly a function of the smartphone 2 is automatically validated or invalidated. That is, according to the smartphone 2, in a case where a state where an accurate determination process cannot be carried out continues for a predetermined time, the calibration section 103 carries out calibration so that the accurate determination process can be carried out. This allows an improvement in convenience.

A process carried out until the calibration section 103 carries out the calibration will be described below in detail. That is, in a case where a contact determination section 101 notifies the calibration section 103 that an output value outputted by the contact sensor 11 which has once become higher than TH3 is lower than TH3, the calibration section 103 causes the timer 13 to operate. Until the contact determination section 101 notifies the calibration section 103 that the output value outputted by the contact sensor 11 is lower than TH4, the calibration section 103 causes the timer 13 to continue to operate. In a case where the duration of the state where the output value outputted by the contact sensor 11 is lower than TH3 and higher than TH4 exceeds the calibration reference time 122, the calibration section 103 calibrates the output value outputted by the contact sensor 11, that is, corrects a level which serves as the reference of the output value outputted by the contact sensor 11. By carrying out the calibration, it becomes possible for the contact determination section 101 to carry out a normal determination process in accordance with the output value outputted by the contact sensor 11.

FIG. 8 is a flowchart illustrating a flow of a process carried out by the smartphone 2. The contact determination section 101 examines whether both of output values outputted by respective contact sensors 11R and 11L are lower than TH3 (step S31). In a case where both of the output values are not lower than TH3, the contact determination section 101 repeats the step S31 until both of the output values become lower than TH3. In a case where both of the output values are lower than TH3 (YES, in the step S31), the contact determination section 101 further examines whether both of the output values outputted by the respective contact sensors 11R and 11L are lower than TH4 (step S32). In a case where both of the output values are lower than TH4 (YES, in the step S32), the contact determination section 101 determines that the contact sensor 11 is brought back to a normal state, and carries out the normal determination process (step S39). In a case where both of the output values are not lower than TH4 (NO, in the step S32), the contact determination section 101 determines that the contact sensor 11 is in an unstable state after being in an abnormal state, and does not determine that a hand is in contact with the contact sensor 11 (step S33). That is, the contact determination section 101 determines that the hand is not in contact with the contact sensor 11. The calibration section 103 then causes the timer 13 to operate and start counting down (step S34). That is, the calibration section 103 causes the timer 13 to (i) measure the duration of the state where the output value outputted by the contact sensors 11 is lower than TH3 and higher than TH4 and (ii) count down until the duration exceeds the calibration reference time 122. While the timer 13 is counting down, the contact determination section 101 examines whether both of the output values outputted by the respective contact sensors 11R and 11L are lower than TH4 (step S35). In a case where both of the output values are lower than TH4 (YES, in the step S35), the process shifts to a step S39. In a case where both of the output values remains not lower than TH4 (NO, in the step S35), the calibration section 103 causes the timer 31 to continue counting down (step S36). The calibration section 103 then examines whether the duration of the state where the output value outputted by the contact sensor 11 is lower than TH3 and higher than TH4 exceeds the calibration reference time 122. That is, the calibration section 103 examines whether the timer 13 has counted down to 0 (zero) (step S37). In a case where the timer 13 has not counted down to 0 (zero) (NO, in the step S37), that is, the duration does not exceed the calibration reference time 122, the contact determination section 101 and the calibration section 103 repeat the respective steps S35 and S36 until the timer 13 counts down to 0 (zero). In a case where the timer 13 counts down to 0 (zero) (YES, in the step S37), the calibration section 103 forcibly calibrates one or both of the output values outputted by the respective contact sensors 11R and 11L, which one is higher than TH4, so as to reset an abnormal determination process (step S38) and so as to bring the contact sensor 11 back to the normal state.

Figure 9:
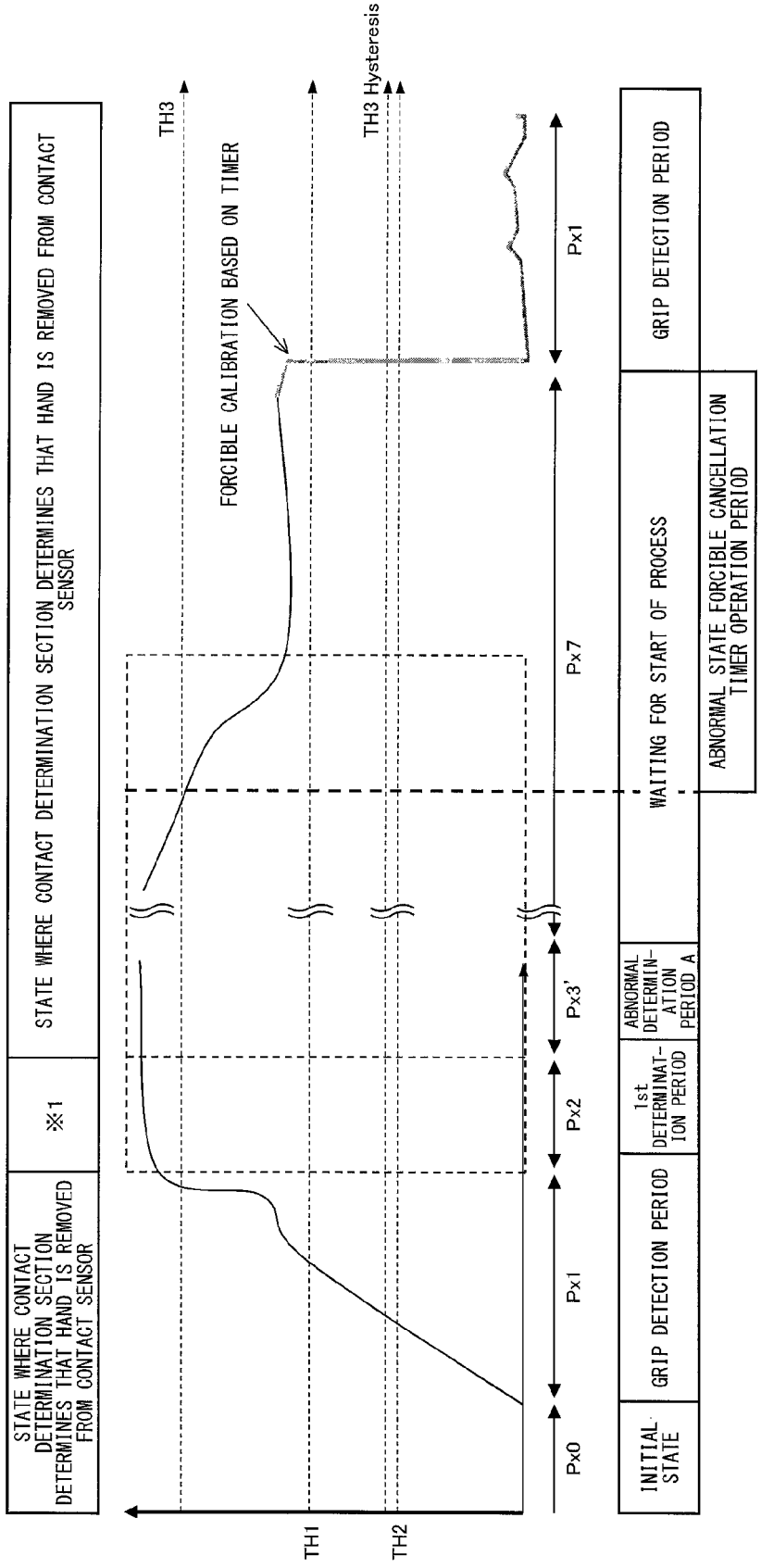
FIG. 9 is a view illustrating an outline of an abnormal determination process and an outline of an unstable determination process each of which processes is carried out by the smartphone illustrated in FIG. 7.

FIG. 9 is a view illustrating an outline of the abnormal determination process and an outline of an unstable determination process each of which processes are carried out by the smartphone 2. In FIG. 9, Px7 indicates a period in which a start of the unstable determination process is awaited. Once the output value outputted by the contact sensor 11 becomes not lower than TH3, the contact sensor 11 carries out scan, that is, detection, but, the contact determination section 101 does not carry out the normal determination process and the unstable determination process in accordance with the output value outputted by the contact sensor 11 as a result of the detection. The normal determination process and the unstable determination process are not carried out until the output value outputted by the contact sensor 11 becomes lower than TH4. Px3' includes a 1st determination period and an abnormal determination period. In the 1st determination period, in a case where each of the output values outputted by the respective contact sensors 11R and 11L is higher than TH1 and not higher than TH3 over predetermined times of the scan (predetermined time) or more, the contact determination section 101 proceeds to a false detection determination period A (false operation determination period A) as the normal determination process. On the other hand, in the 1st determination period, in a case where each of the output values outputted by the respective contact sensors 11R and 11L is higher than TH3 over the predetermined times of the scan (predetermined time) or more, the contact determination section 101 proceeds to the abnormal determination period. In the abnormal determination period, in a case where each of the output values outputted by the respective contact sensors 11R and 11L is higher than TH3 over predetermined times of the scan or more, the contact determination section 101 carries out the abnormal determination process. In the abnormal determination period, the contact determination section 101 does not carry out the normal determination process and the unstable determination process until the output value outputted by the contact sensor 11 becomes lower than TH4. In a case where the output value outputted by the contact sensor 11 which output value has been once higher than TH3 becomes lower than TH4, the contact determination section 101 proceeds to the normal determination process, that is, proceeds to a grip detection period which is a period coming prior to the 1st determination period in which the contact determination section 101 first determines whether or not the hand of the user is in contact with the contact sensor 11. At a timing when the output value which has been once higher than TH3 becomes lower than TH3, the contact determination section 101 proceeds to an abnormal state forcible cancellation timer operation period. That is, at the timing when the output value becomes lower than TH3, the calibration section 103 causes the timer 13 to operate and measure the duration of the state where the output value is lower than TH3 and not lower than TH4. In a case where the duration measured by the timer 13 exceeds the calibration reference time 122, that is, at an end point of the abnormal state forcible cancellation timer operation period, the calibration section 103 calibrates the absolute value of the output value outputted by the contact sensor 11. This causes the contact determination section 101 to proceed to the normal determination process, that is, to the grip detection period which is a period coming prior to the 1st determination period in which the contact determination section 101 first determines whether or not the hand of the user is in contact with the contact sensor 11.

Embodiment 3

The following description will discuss Embodiment 3 of the present invention with reference to FIG. 10. FIG. 10 is a view illustrating an appearance of a smartphone 3 in accordance with Embodiment 3. As illustrated in FIG. 10, a housing of the smartphone 3 includes a conduit, arranged along a contact sensor 11, through which a liquid such as water passes (see shaded areas enclosed by respective dotted lines illustrated in FIG. 10). That is, although the smartphone 3 itself is a waterproof terminal, the smartphone 3 is arranged such that no waterproof measure is intentionally implemented around the contact sensor 11 so that water flows around the contact sensor 11 on purpose. Further, the housing of the smartphone 3 has several holes so that water can easily flow into and out of the conduit. Note that no waterproof measure can be implemented, not only around the contact sensor 11, but also on wiring from the contact sensor 11 to a control section 10. It is not essential to provide the holes. Furthermore, the number of the holes is not particularly limited. For example, providing the holes or the number of the holes can be determined in view of design, provided that water can be easily removed from around the contact sensor 11. According to the smartphone 3, the conduit makes it possible to easily remove water from around the contact sensor 11. This allows the contact sensor 11 to be recovered early from an abnormal state where an output value outputted by the contact sensor 11 is extraordinarily high.

Embodiment 4

Embodiments 1 through 3 have described an example in which a contact sensor 11 is provided to a lower half of a side of a mobile terminal. However, it is not essential that the contact sensor 11 be provided to the lower half of the side of the mobile terminal. The contact sensor 11 only needs to be provided at a position with which a hand of a user is in contact while the user is holding a housing. The position at which the contact sensor 11 is provided is not limited to the lower half of the side of the mobile terminal, and the contact sensor 11 can extend also in an upper direction. Alternatively, the contact sensor 11 can be provided to, not the side of the mobile terminal, but on a lower side of a touch panel screen of the smartphone 1.

Embodiment 5

The control section 10, 20 (especially, the contact determination section 101, the mobile terminal control section 102, and the calibration section 103) of the smartphone 1, 2 can be realized by a logic circuit (hardware) provided in an integrated circuit (IC chip) or the like or can be alternatively realized by software as executed by a CPU (Central Processing Unit). In the latter case, the smartphone 1, 2 includes a CPU that executes instructions of a program that is software realizing the foregoing functions; ROM (Read Only Memory) or a storage device (each referred to as "storage medium") in which the program and various kinds of data are stored so as to be readable by a computer (or a CPU); and RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

SUMMARY

A mobile terminal (smartphone 1) in accordance with a first aspect of the present invention is a mobile terminal including: a contact sensor (11) which, in a case where an object, such as water, having a high dielectric constant is in contact with the contact sensor, outputs an output value whose absolute value is higher than that of an output value which the contact sensor usually outputs in a case where a hand of a user is in contact with the contact sensor, the contact sensor being provided at a position with which the hand of the user is in contact while the user is holding a housing; and a contact determination section (101) which determines that (i) the hand is in contact with the contact sensor in a case where an absolute value of an output value outputted by the contact sensor is not lower than a first threshold (TH1) and lower than a third threshold (TH3) which is higher than the first threshold, (ii) the hand is removed from the contact sensor in a case where the absolute value of the output value is not higher than a second threshold (TH2) which is lower than the first threshold, and (iii) the object, such as water, having the high dielectric constant is in contact with the contact sensor in a case where the absolute value of the output value is not lower than the third threshold.

According the mobile terminal thus configured, also in a case where an absolute value of an output value outputted by the contact sensor is extraordinarily high due to water being in contact with the contact sensor, it is possible to avoid falsely determining that a hand is in contact with the contact sensor. Therefore, in a case where, for example, a user accidentally submerges the mobile terminal, the mobile terminal does not carry out operation which the mobile terminal carries out in a case where the mobile terminal falsely determines that a hand is in contact with the contact sensor. Accordingly, the mobile terminal is capable of reducing unnecessary operation and thereby reducing electric power consumption, and moreover, capable of carrying out stable and safe operation.

The mobile terminal in accordance with a second aspect of the present invention can be arranged such that, in the first aspect, after the contact determination section determines that the object, such as water, having the high dielectric constant is in contact with the contact sensor, the contact determination section determines that the object, such as water, having the high dielectric constant is in contact with the contact sensor, until the absolute value of the output value outputted by the contact sensor becomes not higher than a fourth threshold which is lower than the third threshold.

According to the above configuration, it is possible to avoid occurrence of a situation in which the absolute value of the output value outputted by the contact sensor becomes higher and lower than the third threshold so that the mobile terminal repeats (i) operation which is carried out in a case where a human is in contact with the contact sensor and (ii) operation which is carried out in a case where the mobile terminal is submerged and accordingly the contact sensor is in an abnormal state. In particular, once the mobile terminal is submerged, water is not completely removed from around the contact sensor, even after the mobile terminal is taken out of the water. This may easily cause unstable operation as described above. However, according to the above configuration, in a state where water is not completely removed from around the contact sensor, it is possible to stably avoid falsely detecting a hand being in contact with the contact sensor.

The mobile terminal (smartphone 2) in accordance with a third aspect of the present invention can be arranged so as to, in the second aspect, further include: a timer (13) which measures duration of a state where the absolute value of the output value outputted by the contact sensor is lower than the third threshold and higher than the fourth threshold; and a calibration section (103) which calibrates the absolute value of the output value outputted by the contact sensor, in a case where the duration exceeds a predetermined time.

According to the above configuration, in a case where the absolute value of the output value outputted by the contact sensor is lower than the third threshold but higher than the fourth threshold so that, although a hand is actually in contact with the contact sensor, it remains impossible to accurately determine that the hand is in contact with the contact sensor, the calibration section calibrates the absolute value of the output value outputted by the contact sensor. Therefore, it is possible to avoid false detection (in a scene or a usage case beyond user's expectation, a hand being in contact with or removed from the contact sensor 11 is detected, and accordingly a function of the mobile terminal is automatically validated or invalidated) in a case where the absolute value of the output value outputted by the contact sensor is extraordinarily high due to water being in contact with the contact sensor. Furthermore, in a case where a state where an accurate determination process cannot be carried out continues for a predetermined time, the calibration section carries out calibration so that the accurate determination process can be carried out. This allows an improvement in convenience.

The mobile terminal (smartphone 3) in accordance with a fourth aspect of the present invention can be arranged such that, in any one of the first through third aspects, the housing includes a conduit, arranged along the contact sensor, through which a liquid such as water passes.

According to the above configuration, the conduit makes it possible to easily remove water from around the contact sensor. This allows the contact sensor to be recovered early from a state where the absolute value of the output value outputted by the contact sensor is extraordinarily high.

A control method in accordance with a fifth aspect of the present invention is a method of controlling a mobile terminal including a contact sensor which, in a case where an object, such as water, having a high dielectric constant is in contact with the contact sensor, outputs an output value whose absolute value is higher than that of an output value which the contact sensor usually outputs in a case where a hand of a user is in contact with the contact sensor, the contact sensor being provided at a position with which the hand of the user is in contact while the user is holding a housing, the method including: a contact determination step (S11 through S13) of determining that (i) the hand is in contact with the contact sensor in a case where an absolute value of an output value outputted by the contact sensor is not lower than a first threshold and lower than a third threshold which is higher than the first threshold, (ii) the hand is removed from the contact sensor in a case where the absolute value of the output value is not higher than a second threshold which is lower than the first threshold, and (iii) the object, such as water, having the high dielectric constant is in contact with the contact sensor in a case where the absolute value of the output value is not lower than the third threshold.

According to the above method, it is possible to bring about effects similar to those brought about in the first aspect.

The mobile terminal can be realized by a computer. In this case, the scope of the present invention encompass (i) a control program for causing a computer to function as each section of the mobile terminal and (ii) a computer-readable recording medium in which the control program is recorded.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to a wide range of mobile terminals, such as a mobile phone, a PHS, and a cordless phone, which sound an alarm.

REFERENCE SIGNS LIST

1 Smartphone (mobile terminal)
2 Smartphone (mobile terminal)
3 Smartphone (mobile terminal)
11 Contact sensor
13 Timer
101 Contact determination section (contact determination means)
103 Calibration section (calibration means)
122 Calibration reference time (predetermined time)
TH1 First threshold
TH2 Second threshold
TH3 Third threshold
TH4 Fourth threshold

The invention claimed is:

1. A mobile terminal comprising:
a contact sensor which, in a case where an object, such as water, having a high dielectric constant is in contact with the contact sensor, outputs an output value whose absolute value is higher than that of an output value which the contact sensor usually outputs in a case where a hand of a user is in contact with the contact sensor, the contact sensor being provided at a position with which the hand of the user is in contact while the user is holding a housing; and
a contact determination section which determines that (i) the hand is in contact with the contact sensor in a case where an absolute value of an output value outputted by the contact sensor is not lower than a first threshold and lower than a third threshold which is higher than the first threshold, (ii) the hand is removed from the contact sensor in a case where the absolute value of the output value is not higher than a second threshold which is lower than the first threshold, and (iii) the object, such as water, having the high dielectric constant is in contact with the contact sensor in a case where the absolute value of the output value is not lower than the third threshold.

2. The mobile terminal as set forth in claim 1, wherein, after the contact determination section determines that the object, such as water, having the high dielectric constant is in contact with the contact sensor, the contact determination section determines that the object, such as water, having the high dielectric constant is in contact with the contact sensor, until the absolute value of the output value outputted by the contact sensor becomes not higher than a fourth threshold which is lower than the third threshold.

3. A mobile terminal as set forth in claim 2, further comprising:
a timer which measures duration of a state where the absolute value of the output value outputted by the contact sensor is lower than the third threshold and higher than the fourth threshold; and
a calibration section which calibrates the absolute value of the output value outputted by the contact sensor, in a case where the duration exceeds a predetermined time.

4. The mobile terminal as set forth in claim 1, wherein the housing includes a conduit, arranged along the contact sensor, through which a liquid such as water passes.

5. A method of controlling a mobile terminal including a contact sensor which, in a case where an object, such as water, having a high dielectric constant is in contact with the contact sensor, outputs an output value whose absolute value is higher than that of an output value which the contact sensor usually outputs in a case where a hand of a user is in contact with the contact sensor, the contact sensor being provided at a position with which the hand of the user is in contact while the user is holding a housing, the method comprising:
a contact determination step of determining that (i) the hand is in contact with the contact sensor in a case where an absolute value of an output value outputted by the contact sensor is not lower than a first threshold and lower than a third threshold which is higher than the first threshold, (ii) the hand is removed from the contact sensor in a case where the absolute value of the output value is not higher than a second threshold which is lower than the first threshold, and (iii) the object, such as water, having the high dielectric constant is in contact with the contact sensor in a case where the absolute value of the output value is not lower than the third threshold.

* * * * *